United States Patent [19]

Morningstar et al.

[11] 4,371,677
[45] Feb. 1, 1983

[54] PROCESS FOR MAKING DISPERSION COPOLYMERS THROUGH MONOMER METERING

[75] Inventors: Marion G. Morningstar, Avon Lake; Thomas J. Doyle, Lorain, both of Ohio

[73] Assignee: The B.F. Goodrich Company, Akron, Ohio

[21] Appl. No.: 301,618

[22] Filed: Sep. 14, 1981

[51] Int. Cl.$^3$ .................................................. C08K 5/05
[52] U.S. Cl. ....................................... 526/80; 526/212; 526/317; 526/329.4; 526/87
[58] Field of Search ........................... 526/80, 212, 87

[56] References Cited

U.S. PATENT DOCUMENTS

| | | | |
|---|---|---|---|
| 2,628,957 | 2/1953 | Tucker | 260/87.5 |
| 3,293,199 | 12/1966 | Abercrombie | 260/17 |
| 3,637,620 | 1/1972 | Patron et al. | 260/85.5 |
| 3,671,508 | 1/1972 | Koyanagi et al. | 260/87.1 |
| 4,071,675 | 1/1978 | Yu et al. | 526/193 |
| 4,076,920 | 2/1978 | Mikofalvy et al. | 526/74 |

FOREIGN PATENT DOCUMENTS 581995 10/1946 United Kingdom .

*Primary Examiner*—Joseph L. Schofer
*Assistant Examiner*—Bernard Lipman
*Attorney, Agent, or Firm*—Joe A. Powell; Alan A. Csontos

[57] ABSTRACT

The present invention relates to a process for producing low energy dispersion vinyl copolymers which, in a plastisol, can be fused at lower temperatures or in a shorter period of time than presently available dispersion vinyl copolymers. It has been found that if, instead of adding all the comonomer batchwise prior to the start of the reaction, the comonomer, such as methyl acrylate, for example, is metered into the reactor continuously, or intermittently, during all or part of the polymerization reaction period, a dispersion vinyl copolymer is produced that has a lower plastisol viscosity for a given comonomer content. Plastisols made from the vinyl copolymers of the present invention have good flow properties and the fused films made therefrom have high gloss, high clarity and good mechanical strength, even when fused at low temperatures.

20 Claims, No Drawings

PROCESS FOR MAKING DISPERSION COPOLYMERS THROUGH MONOMER METERING

BACKGROUND OF THE INVENTION

It is well known that vinyl resins may be plasticized or changed from the hard, horny and stiff state to a soft, plastic workable condition by the addition thereto of certain plasticizers, such as dioctyl phthalate, and the like. These vinyl polymers or resins are referred to as dispersion resins or paste resins and are usually made employing an emulsion polymerization technique. When a vinyl resin is mixed or blended with a plasticizer, it is referred to as a "plastisol". By virtue of the flowability of the plastisol, it can be processed into various useful products. Plastisols can be used in making molded products, coatings, and the like. Accordingly, the dispersion resin must be capable of being mixed with a plasticizer easily and uniformly to form low viscosity plastisols which are stable, containing particles of uniform and proper size, and capable of producing films and like products, of good clarity.

The vinyl copolymers made by emulsion polymerization are very useful in making plastisols for extruded products, films, and the like. When making vinyl copolymers by emulsion polymerization, one cannot get enough comonomer into the polymer to get the desired results in the plastisol, such as low fusion temperature in the plastisol. Increasing the concentration of comonomer results in increasing plastisol viscosity. When enough comonomer is incorporated in the copolymer to give the desired low fusion temperature, it often becomes impossible to make a fluid dispersion of the copolymer in the plasticizer at practical ratios.

A most important problem today is the increasing cost of energy. As a result, there is a great need in the marketplace for a low-energy vinyl copolymer or resin. By low energy vinyl copolymer is meant one that can be processed either at a lower temperature or at a faster speed as compared to those vinyl copolymers currently available. This is particularly important in the case of the dispersion vinyl copolymers where a large amount of heat is needed to fuse the plastisols made therefrom. Therefore, there is a need in the art for a method of making low fusion dispersion vinyl copolymers which result in improved plastisol properties.

SUMMARY OF THE INVENTION

We have found that a low energy dispersion vinyl copolymer can be made which, in a plastisol, can be fused at low temperatures or in a shorter time than the normal dispersion grade vinyl copolymers presently employed in the field. We have unexpectedly found that if, instead of adding all the comonomer batchwise at the start of the polymerization reaction, the comonomer, such as methyl acrylate, for example, is metered into the reactor continuously, or intermittently, during all or part of the polymerization reaction period, a vinyl copolymer is produced that has a lower plastisol viscosity for a given comonomer content. Plastisols made from the vinyl copolymers of the present invention have good flow properties and the fused films made therefrom have high gloss, high clarity, and good mechanical strength, even when fused at low temperatures.

DETAILED DESCRIPTION

In the present invention, "low energy" or "low fusion dispersion vinyl copolymer" refers to copolymers of vinyl and vinylidene halides, such as vinyl chloride, vinylidene chloride, and the like. The vinyl halides and vinylidene halides are copolymerized with one or more vinylidene monomers which have at least one terminal $CH_2=C<$ grouping. Such copolymerizable vinylidene monomers are the $\alpha,\beta$-olefinically unsaturated carboxylic acids, such as acrylic acid, methacrylic acid, ethacrylic acid, $\alpha$-cyanoacrylic acid, and the like; esters of acrylic acid, such as methyl acrylate, ethyl acrylate, butyl acrylate, octylacrylate, cyanoethyl acrylate, hydroxyethyl acrylate, and the like; and esters of methacrylic acid, such as methyl methacrylate, butyl methacrylate, and the like. The present invention is particularly applicable to the manufacture of dispersion vinyl copolymers made by the copolymerization of vinyl chloride or vinylidene chloride and methyl acrylate. The most preferred copolymer is that made from vinyl chloride and methyl acrylate and the invention, for simplicity and convenience, will be described in connection therewith, it being understood that this is merely intended in an illustrative sense and not limitative.

The essence of the present invention process is the manner in which the comonomer(s) is added to the reaction medium. The comonomer is metered into the reaction medium during the course of the polymerization reaction or it can be added intermittently in increments, if so desired. When using the constant metering of comonomer, it will usually be added at a rate so that about 1/12 to about 1/6 of the total comonomer is added per hour. The amount of comonomer will, of course, depend upon the size of the reactor and the total charge. The metering is regulated so as to start at "zero" hour (the beginning of the reaction) and be complete at about 2 hours to about 6 hours prior to completion of the reaction. This allows for complete copolymerization and reduces the possibility of too large an amount of unreacted comonomer remaining upon completion of the reaction. The reason for metering the comonomer is to control the resultant plastisol viscosity as the comonomer content of the copolymer increases. For example, without metering, a vinyl dispersion copolymer containing more than 5.5% comonomer cannot be made into a usable plastisol. However, by means of the present invention, it is possible to get about 1.0% to about 15.0% by weight of comonomer into the copolymer.

When preparing dispersion vinyl copolymers or paste resins, the same is done by means of an emulsion polymerization technique in an aqueous medium. When using the emulsion polymerization procedure, the aqueous reaction medium will contain one or more emulsifiers, or an emulsifier system, such as salt of a long chain saturated fatty acid, for example, an alkali metal or ammonium salt of a long chain saturated fatty acid, and a long straight chain saturated alcohol. The saturated fatty acids may be either natural or synthetic and should contain from 8 to 20 carbon atoms. As examples of such acids, there may be named lauric, myristic, palmitic, marganic, stearic, and the like, beef tallow, coconut oil, and the like. Good results are also obtained when anionic emulsifiers are employed, such as the alkali metal or ammonium salts of the sulfates of alcohols having from 8 to 18 carbon atoms. Examples of such emulsifiers are sodium lauryl sulfate, ethanolamine lauryl sulfate, ethylamine lauryl sulfate, and the like; alkali metal and ammonium salts of sulfonated petroleum and paraffin oils; sodium salts of hydrocarbon sulfonic acids, such sas dodecane-1-sulfonic acid and octadiene-1-sulfonic acid; sodium salts of alpha-olefin sulfonates, aralkyl sulfonates, such as sodium isopropyl benzene sulfonate, sodium dodecyl benzene sulfonate, sodium isobutyl naphthalene sulfonate, and the like; alkali metal and ammonium salts of sulfonate, and the like; alkali metal and ammonium salts of sulfonate dicarboxylic acid esters, such as sodium dioctyl sulfosuccinate, disodium-n-octadecyl sulfosuccinate, and the like; alkali metal and ammonium salts of the free acid of complex organic mono- and di-phosphate esters and the like. Nonionic emulsifiers, such as octyl- or nonylphenyl polyethoxyethanol, may also be used. Dispersion vinyl copolymer latices having excellent stability are obtained when using the alkali metal and ammonium salts of aromatic sulfonic acid, aralkyl sulfonates and long chain sulfonates. The emulsifier is employed in an amount in the range of about 0.5% to about 2.0% by weight, based on the weight of the basic monomer being polymerized. Preferably, the emulsifier is used in an amount in the range of about 0.7% to about 1.5% by weight. When using more than one emulsifier in the system, the combined weight will be in the same range.

In many instances, particularly where certain desirable properties are desired, a long straight chain saturated alcohol containing from 8 to 24 carbon atoms is employed in the emulsifier system. The addition of the alcohol to the emulsifier system increases the colloidal stability of the polymerization and reduces the amount of coagulum in the copolymer latex and the amount of copolymer buildup on the internal surfaces of the reactor. As examples of such alcohols, there may be named octanol, nonanol, decanol, undecanol, dodecanol, tridecanol, tetradecanol, pentadecanol, hexadecanol, heptadecanol, octadecanol, nonadecanol, eicosanol, heneicosanol, docosanol, tricosanol, tetracosanol, etc. Mixtures of the alchols can also be used. Also, lower carbon content alcohols can be employed when mixed with the longer chain length alcohols. When an alcohol(s) is used, the ratio of alcohol(s) to emulsifier(s) will be in the range of about 0.25 to about 2.5.

The process described herein is conducted in the presence of a compound capable of initiating the polymerization reaction. Free radical yielding initiators, normally used for polymerizing olefinically unsaturated monomers, are satisfactory for use in the present process. The useful initiators or catalysts include, for example, the various peroxygen compounds, such as lauroyl peroxide, secondary butyl peroxydicarbonate, 2-ethylhexyl peroxydicarbonate, isopropyl peroxydicarbonate, benzoyl peroxide, t-butyl hydroperoxide, diisononanoyl peroxide, t-butyl peroxypivalate, cumene hydroperoxide, t-butyl diperphthalate, pelargonyl peroxide, 1-hydroxyclyohexyl hydroperoxide, and the like; azo compounds, such as azodiisobutyronitrile, dimethylazoazodiisubutyrate, and the like. Also useful initiators are the water-soluble peroxygen compounds, such as hydrogen peroxide, persulfates, such as potassium persulfate, ammonium persulfate, and the like. The amount of initiator used will generally be in the range of about 0.01% to about 0.4% by weight, based on the weight of 100 parts of monomers being copolymerized, and preferably between about 0.02% and about 0.4% by weight.

In the present process, the initiator is charged completely at the outset of the polymerization reaction. The initiator is charged at the outset by adding it to the monomer premix with the other ingredients of the reaction mixture, except the comonomer, which is added constantly or intermittently after the reaction is started. The addition of the initiator at the outset is particularly true when said premix is homogenized prior to introduction into the reactor, as in the pesent invention. However, when adding the initiator to the monomer premix and then homogenizing, it is necessary that the temperature during the premixing and homogenization steps be kept below the minimum temperature of reactivity of the particular initiator or initiators being employed. For example, when making a premix of vinyl chloride, water, a sodium salt of a fatty acid and a long straight chain saturated alcohol, and then adding t-butyl peroxypivalate initiator thereto, the temperature is maintained at 25° C. during the mixing step and then during the homogenization step. Upon introduction of the homogenized mixture into the polymerization reactor, the temperature is then raised to that at which the reaction is to take place. When the reaction temperature is reached, the addition of the comonomer is begun and added at a constant rate up to about 2 to about 6 hours prior to completion of the reaction. When the comonomer is added intermittently after the start of the reaction, it is added in equal increments at intervals of about 30 minutes to about 180 minutes up to about 2 to about 6 hours prior to completion of the reaction.

The temperature of the reaction is important since the inherent viscosity (IV) is a direct function of the temperature of reaction. That is, the higher the temperature, the lower the IV. Thus, the end use for the low fusion dispersion vinyl copolymer to be produced will normally dictate the reaction temperature. For example, when producing dispersion vinyl copolymers to be used in coatings or casting flexible films, a lower temperature will be used in order to attain a higher IV which is desirable for many coating applications. It has been found that for the end uses to which the dispersion vinyl copolymers are particularly adapted, polymerization temperatures in the range of about 35° C. to about 60° C. are satisfactory. It is preferred, however, to employ a temperature of reaction in the range of about 40° C. to about 50° C. It should also be pointed out that, as the temperature of reaction is increased, the polymer buildup on the inner surfaces of the reactor increases. However, the buildup is not of the hard crusty type and can readily be removed by rinsing or hosing down with water and without opening the reactor when appropriate spray nozzles are installed in the reactor. Upon completion of the polymerization reaction, the dispersion vinyl copolymer is isolated in powder form from the latex by means of spray drying. That is, a fine spray of the copolymer latex is injected into a heated air chamber thereby removing the water and recovering the dried copolymer in powder form.

Plastisols are made with the dispersion vinyl copolymers of the present invention by uniformly blending or intimately mixing, by conventional means, with 100 parts by weight of the dispersion vinyl copolymer in powder form, from about 30 to about 100 parts by weight of one or more plasticizers. The useful plasticizers may be described as the alkyl and alkoxy alkyl esters of dicarboxylic acids or the esters of a polyhydric alcohol and monobasic acid. As examples of such materials, there may be named dibutyl phthalate, dioctyl phthalate, dibutyl sebacate, dinonyl phthalate, di(2-ethyl hexyl) phthalate, di(2-ethyl hexyl) adipate, dilauryl phthalate, dimethyl tetrachlorophthalate, butyl phthalyl butyl glycollate, glyceryl stearate, and the like, epoxidized soybean oil, etc. The preferred plasticizers are the liquid diesters of aliphatic alcohols having from 4 to 20 carbon atoms and dibasic carboxylic acids having from 6 to 14 carbon atoms.

The plastisols made from the dispersion vinyl copolymers of the present invention should have the desired yield and preferably with little or no dilatency. Yield is simply defined as resistance to flow and is normally determined numerically through viscosity measurements employing well-known standard techniques. Normally, such values are arrived at by calculation from viscosity measurements of the plastisols using a Brookfield Model RVF Viscometer according to ASTM method D1824-61T. Yield is determined from viscosity measurements of the plastisols at varying rpm's (revolutions per minute) after initial preparation and at intervals of aging. The viscosity is measured in centipoises (cps.) at a temperature of 23° C. In the specific examples that follow hereinafter, viscosity measurements were made at 2 rpm and 20 rpm and are expressed as $V_2$ and $V_{20}$ respectively.

When putting all of the comonomer into the premix prior to the start of the reaction, the Brookfield viscosity is nearly constant in the range of about 2% to 4.5% by weight of comonomer and rises very rapidly above such concentration. This means that for a regular vinyl chloride copolymer wherein 4% comonomer is charged batchwise giving 5% to 5.5% by weight of comonomer in the copolymer, if one attempts to improve fusion by increasing the comonomer content, the plastisol viscosity will increase very rapidly. In fact, 6% by weight of comonomer in the copolymer, or 4.5% by weight of comonomer charged batchwise, is about the practical upper limit for batch charging. However, in the case of comonomer metering, in all cases, at any given comonomer level, metered copolymer has a lower plastisol viscosity than the corresponding batch polymer. Charges that give the highest plastisol viscosity for a given comonomer level are those in which the comonomer is added the fastest. When the addition of comonomer is slowed down, the end of metering occurs at higher conversions. This is reasonable since, as comonomer is added faster and faster, the limit is batch charging. Conversely, as the comonomer is added slower, the composition of the copolymer particles becomes more uniform, but the practical limit is reached when an appreciable amount of unreacted comonomer is left in the copolymer. Accordingly, the last of the comonomer should be added at, or just before, or soon after pressure drop starts. For enhanced plastisol properties, the most useful range for comonomer metering lies in the range of about 5.5% and 10.0% by weight of comonomer in the copolymer or in the range of about 4.0% and 7.5% by weight of comonomer charged to the reactor.

To further illustrate the present invention, the following specific examples are given, it being understood that this is merely intended in an illustrative and not a limitative sense. In the examples, all parts and percents are by weight unless otherwise indicated.

EXAMPLE I

In this example, four (4) runs were made in order to compare addition of all the comonomer to the premix prior to reaction and metering the comonomer into the reactor at a constant rate during the reaction. The comonomer employed was methyl acrylate using 5 parts thereof in one case and 6 parts in the other. The recipe employed in all runs was as follows:

| INGREDIENT | PARTS |
|---|---|
| Vinyl chloride | 95 and 94 parts |
| Methyl acrylate | 5 and 6 parts |
| Water (demineralized) | 167 parts |
| Alipal CO-433* | 1.0 parts |
| Alcohol ($C_{12}$ + $C_{18}$) | 2.0 parts |
| Sec butyl peroxydicarbonate | 0.0006 parts |
| Lauroyl peroxide | 0.359 parts |

*Sodium salt of sulfated nonyl phenoxy poly (ethyleneoxy) ethanol.

In runs 1 and 3, the methyl acrylate was batched in, i.e., added to the premix prior to the start of the reaction. In runs 2 and 4, the methyl acrylate was left out of the premix and then metered continuously to the polymerization vessel starting at zero hour and continuing until from 2 to 5 hours before the end of the polymerization reaction. The ingredients were premixed and then passed through a two-stage Manton-Gaulin homogenizer with 600 psi pressure on each stage and into a 15-gallon polymerization reactor equipped with an agitator and jacketed. During premixing and homogenization, the temperature was maintained at 25° C. or below. Thereafter, the reaction medium in each case was agitated and heated to the reaction temperature of 45° C. In runs 2 and 4 the metering of methyl acrylate was begun when 45° C. was reached and metered as shown in the table below. In each run the copolymer was recovered upon completion of the reaction by spray drying.

In order to determine RVF Viscosity, plastisols were made with the copolymer of each run using the following recipe:

| INGREDIENT | PARTS |
|---|---|
| Copolymer | 100 Parts |
| Dioctyl phthalate | 57 parts |
| Epoxidized soybean oil | 3 parts |
| Ba—Cd—Zn stabilizer | 2 parts |

The results are shown in the following table:

TABLE I

| RUN NO. | 1 | 2 | 3 | 4 |
|---|---|---|---|---|
| % Methyl acrylate Charged | 5 Batch | 5 Meter | 6 Batch | 6 Meter |
| Metering Time (hrs) | — | 8 | — | 12 |
| Metering Rate (Gms./hr.) | — | 102 | — | 82 |
| BROOKFIELD VISCOSITY (cps) | | | | |
| Initial $V_2$ | 6,500 | 4,000 | 30,000 | 3,500 |
| $V_{20}$ | 5,300 | 3,000 | 52,000 | 3,200 |
| 7 Days $V_2$ | 13,000 | 4,000 | 110,000 | 4,000 |
| $V_{20}$ | 9,200 | 3,100 | 158,000 | 3,500 |
| Severs Efflux | 12 | 24 | 2.5 | 19 |

As can readily be seen from the above data, constant metering of the comonomer greatly improves the plastisol properties. The viscosity and viscosity aging is lowered and the Severs is increased.

EXAMPLE II

In this example, ethyl acrylate was used as the comonomer. Two runs were made, one in which the ethyl acrylate was added to the premix prior to the start of reaction and the other in which the ethyl acrylate was metered into the reactor at a constant rate from the start of the reaction. These runs are numbered 5 and 6 respectively. The recipe employed in both runs was as follows:

| INGREDIENT | PARTS |
| --- | --- |
| Vinyl chloride | 96 parts |
| Ethyl acrylate | 4 parts |
| Water (demineralized) | 167 parts |
| Alipal CO-433 | 1.0 parts |
| Alcohol ($C_{12}$ + $C_{18}$) | 2.0 parts |
| Secbutyl peroxydicarbonate | 0.006 part |
| Lauroyl peroxide | 0.357 part |

In run 5, the ethyl acrylate was batched in or added to the premix prior to the start of the reaction. In run 6, the ethyl acrylate was left out of the premix and then metered continuously to the polymerization reactor starting at zero hour and continuing until from 2 to 5 hours before the end of the polymerization reaction. The ingredients were premixed and then passed through a two-stage Manton-Gaulin homogenizer, with 1200 psi pressure in the first stage and 600 psi pressure in the second stage, into a 15-gallon polymerization reactor equipped with an agitator and jacketed for cooling and heating. During the premixing and homogenization the temperature was maintained at 25° C. or below. Thereafter, the reactor medium in each case was agitated and heated to the reaction temperature of 45° C. In run 6, the metering of ethyl acrylate was begun when 45° C. was reached and metered at a rate of 59 grams per hour. In each run the copolymer was recovered upon completion of the reaction by spray drying.

In order to determine RVF Viscosity, and other properties, plastisols were made with the copolymer of each run using the same recipe as in Example I. The results are shown in the following table:

TABLE II

| RUN NO. | | 5 | 6 |
| --- | --- | --- | --- |
| % Ethyl acrylate | | 4 | 4 |
| Charged | | Batch | Meter |
| BROOKFIELD VISCOSITY (cps.) | | | |
| Initial | $V_2$ | 8,000 | 3,200 |
| | $V_{20}$ | 6,100 | 2,500 |
| 1 Day | $V_2$ | 11,500 | 4,500 |
| | $V_{20}$ | 8,450 | 2,850 |
| 7 Day | $V_2$ | 18,000 | 5,000 |
| | $V_{20}$ | 12,100 | 3,600 |
| Severs Efflux | | 12.25 | 18.90 |
| Tensile Strength (lbs./sq. in.) | | | |
| at Fusion Temperature of: | | | |
| 250° F. | | | |
| 275° F. | | 670 | 710 |
| 300° F. | | 998 | 1063 |
| 325° F. | | 2075 | 2217 |
| | | 2425 | 2630 |
| Elongation (%) | | | |
| 250° F. | | | |
| 275° F. | | 80 | 100 |
| 300° F. | | 137 | 110 |
| 325° F. | | 305 | 283 |
| | | 380 | 387 |

The above results clearly show the superior results obtained when the comonomer is metered in during the course of the reaction rather than adding the same to the premix prior to the reaction.

Copolymers produced by the process of the present invention have many advantages over vinyl dispersion copolymers presently available. For example, without metering of the comonomer, it is not possible to make a useful plastisol copolymer containing more than 6% by weight of the comonomer. By the metering of the present invention plastisol vinyl copolymers can be made containing as much as 10% by weight of comonomer. Further, the viscosity of the plastisols have a low viscosity, good stability, and longer shelf life. Also, the present vinyl copolymers have improved fusion properties when made into plastisols. Numerous other advantages will be readily apparent to those skilled in the art.

While the present invention has been described in terms of its specific embodiments, certain modifications and equivalents will be apparent to those skilled in the art and are intended to be included within the scope of the present invention, which is to be limited only by the reasonable scope of the appended claims.

We claim:

1. A process for producing vinyl dispersion copolymers of vinyl and vinylidene halides with a comonomer selected from the group consisting of acrylic acid, methacrylic acid, esters of acrylic acid, and esters of methacrylic acid, comprising forming a monomer premix containing a vinyl or vinylidene halide, the aqueous reaction medium, from about 0.02% to about 0.4% by weight of a free radical yielding initiator(s) based on the weight of 100 parts of monomer being copolymerized, at least one emulsifier, and at least one long straight chain saturated alcohol containing from 8 to 24 carbon atoms, the ratio of alcohol to emulsifier being in the range of about 0.25 to about 2.5, homogenizing said premix below the reactivity of the catalyst(s) employed, passing said homogenized premix to a reaction zone, emulsion polymerizing said homogenized premix in said zone at a temperature in the range of about 35° C. to about 60° C., metering said comonomer into said reaction zone during the polymerization reaction, said metering being substantially stopped prior to about 2 hours prior to the completion of the reaction, and thereafter recovering the copolymer.

2. A process as defined in claim 1 wherein the vinyl halide in the premix is vinyl chloride.

3. A process as defined in claim 1 wherein the comonomer is methyl acrylate.

4. A process as defined in claim 1 wherein the comonomer is ethyl acrylate.

5. A process as defined in claim 1 wherein the comonomer is metered into the reaction zone continuously at a constant rate.

6. A process as defined in claim 1 wherein the comonomer is metered into the reaction zone intermittently.

7. A process as defined in claim 1 wherein the copolymer contains from about 1.0% to about 15% by weight of the comonomer.

8. A process as defined in claim 1 wherein the alcohol is a mixture of two alcohols containing 12 C's and 18 C's.

9. A process as defined in claim 1 wherein the initiator is secbutyl peroxydicarbonate and lauroyl peroxide.

10. A process as defined in claim 1 wherein the initiator is diisononanoyl peroxide.

11. A process as defined in claim 1 wherein the initiator is 2-ethylhexyl peroxydicarbonate.

12. A process as defined in claim 1 wherein the emulsifier is the sodium salt of sulfated nonyl phenoxy poly (ethyleneoxy) ethanol.

13. A process as defined in claim 2 wherein the comonomer is methyl acrylate.

14. A process as defined in claim 2 wherein the comonomer is ethyl acrylate.

15. A process as defined in claim 1 wherein the amount of emulsifier is in the range of about 0.5% to about 2.0% by weight based on the weight of 100 parts of monomers being copolymerized.

16. A process as defined in claim 13 wherein the methyl acrylate is metered into the reaction zone continuously at a constant rate up to 2 to about 6 hours prior to the completion of the reaction.

17. A process as defined in claim 16 wherein the alcohol is a mixture of two alcohols containing 12 C's and 18 C's.

18. A process as defined in claim 17 wherein the initiator is secbutyl peroxydicarbonate and lauroyl peroxide.

19. A process as defined in claim 18 wherein the premix contains from about 0.5% to about 2.0% by weight based on the weight of 100 parts of monomers being copolymerized of the sodium salt or sulfated nonyl phenoxy poly (ethyleneoxy) ethanol.

20. A process as defined in claim 19 wherein the copolymer contains from about 1.0% to about 15% by weight of methyl acrylate in copolymerized form.

* * * * *